United States Patent Office 3,642,792
Patented Feb. 15, 1972

3,642,792
PYRIDAZINE DERIVATIVES
Elvio Bellasio, Albate, Como, and Giulio Maffii, Milan, Italy, assignors to Lepetit S.p.A., Gruppo per la Ricerca Scientifica e la Produzione Chimica Farmaceutica, Milan, Italy
No Drawing. Filed Feb. 26, 1968, Ser. No. 707,950
Int. Cl. C07d 51/04
U.S. Cl. 260—247.5 R        4 Claims

ABSTRACT OF THE DISCLOSURE

Pyridazines, having in positions 3 and 6 respectively a hydrazino and an amino group variously substituted, are described. The compounds have pharmacological interest because of their hypotensive activity.

---

This invention is concerned with new pharmacologically active compounds, and with a method for preparing them. More particularly the compounds of the invention have the following formula

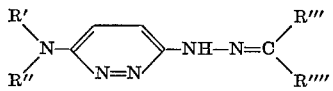

wherein R' is a member selected from the class consisting of hydrogen, lower alkyl, and hydroxy-lower alkyl groups, R'' is a member selected from the class consisting of lower alkyl, hydroxy lower alkyl and phenyl groups, R' and R'' taken together form an optionally lower alkyl substituted heterocyclic ring with 1–2 heteroatoms, R''' is a member of the class consisting of hydrogen and lower alkyl, R'''' is a member of the class consisting of lower alkyl, carboxy, aryl, optionally substituted furyl and thienyl groups.

The compounds of the invention are prepared by reacting a compound having the formula

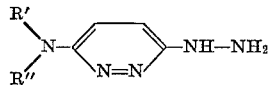

wherein R' and R'' have the above significance, with an amount at least equimolecular of a carbonyl compound of the formula

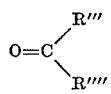

wherein R''' and R'''' have the above significance, in an inert solvent.

The compounds of the invention have proved to possess a strong hypotensive activity which is shared by practically all the members of the class.

For instance 3-(2-isopropylidene-hydrazino)-6-morpholino-pyridazine and 3-[2-(1-methylpropylidene)-hydrazino]-6-morpholino-pyridazine, when administered i.v. to dogs, anesthetized with chloralose and urethane, caused a marked decrease of the blood pressure. The results are reported in Table 1.

TABLE 1

| Ex. | Number of dogs | Dose, mg./kg. I.V. | Decrease of blood pressure, mm. Hg |
|---|---|---|---|
| 1 | 2 | 5 | −90 |
|   | 2 | 1 | −75 |
|   | 1 | 0.5 | −80 |
|   | 2 | 0.1 | −40 |
| 2 | 1 | 5 | −115 |
|   | 1 | 1 | −105 |
|   | 3 | 0.1 | −60 |
| 4 | 2 | 10 | −110 |
|   | 2 | 1 | −75 |
|   | 3 | 0.1 | −55 |
| 14 | 1 | 5 | −102 |
|   | 3 | 1 | −95 |
|   | 2 | 0.1 | −40 |

Further experiments were performed on rats with renal hypertension induced according to the procedure described by Grollman in Proc. Soc. Exptl. Biol. Med., 57, 102 (1944). Animals prepared at least 30 days before and with an arterial pressure not lower than 160 mm. Hg were employed. The compounds were administered per os, once a day for five days, to groups of 3–4 rats at the following doses: 5, 1, 0.5, 0.25, 0.1 mg./kg. A well known hypnotic, i.e. hydralazine, experimented in the same conditions, was used as the term of comparison. The minimal dose, at which the compounds were found to be still effective, are summarized in Table 2, together with the corresponding $LD_{50}$ in mice. The effective dose observed in anesthetized dogs is also given.

TABLE 2

| Compound of Example No. | $LD_{50}$ | Effective dose at— Mg./kg. os, in hypertended rats | Mg./kg. I.V., in anesthetized dogs |
|---|---|---|---|
| 1 | 100 | 0.25 | 0.1 |
| 2 | 80 | 0.25 | 0.1 |
| 3 | 120 | 0.50 | 0.25 |
| 4 | 116 | 0.25 | 0.1 |
| 13 | 150 | 0.50 | 0.25 |
| 14 | 105 | 0.25 | 0.1 |
| Hydralazine | 101 | 1 | 0.5 |

It is apparent from this table that, while the toxicity is practically the same in all cases, a strongly higher activity is displayed by the compounds of the invention with respect to hydralazine, in both type of animals.

The following non-limitative examples illustrate the invention.

EXAMPLE 1

Preparation of 3-(2-isopropylidene-hydrazino)-6-morpholino-pyridazine

An amount of 20 g. of 3-hydrazino-6-morpholino-pyridazine are dissolved in 450 ml. of acetone. The solution is concentrated to 70–80 ml. and cooled on ice. The precipitated solid is separated by filtration, and the liquid is concentrated to 50 ml. After standing, a second crop may be collected. The combined crops are dissolved in boiling ethanol and recrystallized by cooling. Yield 19.3 g. (80%), M.P. 187–190° C.

EXAMPLE 2

Preparation of 3-[2-(1-methylpropylidene)-hydrazino]-6-morpholino-pyridazine

An amount of 3.9 g. of 3-hydrazino-6-morpholino-pyridazine and 1.74 g. of methyl-ethyl ketone are refluxed together with an anhydrous ethanol, until solution is complete. After standing one night the solvent is evaporated at 40° C. in vacuo. The residue is recrystallized from isopropyl ether. Yield 4.23 g. (85%), 125–127° C.

EXAMPLE 3

Preparation of 3-[2-(1-carboxyethylidene)-hydrazino]-6-morpholino-pyridazine

An amount of 3.90 g. of 3-hydrazino-6-morpholino-pyridazine is added to an aqueous solution of 1.68 g. of sodium bicarbonate and 1.76 g. of pyruvic acid. The mixture is stirred until solution is complete. The solution is filtered, then 7.65 ml. of hydrochloric acid 10% are added. A yellow precipitate is formed, which is collected by filtration, washed with ice-water and dried in vacuo over $P_2O_5$. Yield 4.40 g. (83%), M.P. 204–208° C.

EXAMPLE 4

Preparation of 3-(2-isopropylidene-hydrazino)-6-(4-methyl-1-piperazino)-pyridazine An amount of 4.17 g. of 3-hydrazino-6-(4-methyl-1-piperazino)-pyridazine is dissolved in 20 ml. of hot acetone. After standing the precipitated solid is collected and recrystallized from acetone. Yield 4.27 g. (86%), M.P. 158–161° C.

EXAMPLE 5

Preparation of 3-(2-benzylidene-hydrazino)-6-piperidino-pyridazine

Two ethanolic solutions containing respectively 3.86 g. of 3-hydrazino-6-piperidino-pyridazine and 2.12 g. of benzaldehyde are mixed together. The obtained precipitate is recrystallized from isopropyl alcohol. Yield 4.5 g. (80%), M.P. 235–237° C.

EXAMPLE 6

Preparation of 3-[2-(5-nitro-2-thienylidene)-hydrazino]-6-piperidino-pyridazine

An amount of 3.86 g. of 3-hydrazino-6-piperidino-pyridazine and 3.14 g. of 5-nitro-thiophenealdehyde are separately dissolved in the smallest amount of ethanol. The two solutions are mixed and the precipitated solid is collected. Yield 5.2 g. (78%), M.P. 238–240° C.

EXAMPLE 7

Preparation of 3-[2-(5-nitro-2-thienylidene)-hydrazino]-6-morpholino-pyridazine

An alcoholic solution containing 3.14 g. of 5-nitro-2-thiophenealdehyde is added to a solution of 5.36 g. of 3-hydrazino-6-morpholino-pyridazine dihydrochloride, dissolved in methanol. After about 10 minutes a precipitate is formed, which is collected and recrystallized from methanol. This product is 3-[2-(5-nitro-2-thienylidene)-hydrazino]-6-morpholino-pyridazine hydrochloride. Yield 6.15 g., M.P. 244–246° C.

EXAMPLE 8

Preparation of 3-[2-(5-nitro-2-furfurylidene)-hydrazino]-6-morpholino-pyridazine Two separate methanolic solutions, containing respectively 5.36 g. of 3-hydrazino-6-morpholino-pyridazine dihydrochloride and 2.82 g. of 5-nitro-2-furaldehyde are mixed. After standing some hours, the formed precipitate is collected, washed with methanol and dried. This product is 3 - [2 - (5-nitro-2-furfurylidene)-hydrazino]-6-morpholino-pyridazine hydrochloride. Yield 5.32 g. (75%). No melting point was observed below 280° C.

EXAMPLE 9

Preparation of 3 - [2 - isopropylidene-hydrazino]-6-piperidino-pyridazine 15 g. of 3-hydrazino-6-piperidino-pyridazine are dissolved in the smallest volume of acetone to about 0° C. Yellow crystals are soon formed, which are collected by filtering. The formed free base is unstable and darkens rapidly on standing. The crystals are therefore promptly converted into the corresponding hydrochloride by means of a solution of hydrogen chloride in diethyl ether. Yield 10 g. (42%); M.P. 192–195° C.

EXAMPLE 10

Preparation of 3-[2-(1-carboxyethylidene)-hydrazino]-6-piperidino-pyridazine

An amount of 880 mg. of pyruvic acid are dissolved in 6 ml. of water and 840 mg. of sodium bicarbonate are added. When frothing due to the development of carbon dioxide has ceased, 1.94 g. of 3-hydrazino-6-piperidino-pyridazine are added together with 3 ml. more of water. The solution is cooled, acidified with HCl 2 N to a pH of about 4. A yellow precipitate is formed, which is collected and dried in vacuo at room temperature over phosphorus pentoxide. Yield 1.81 (67.0%) M.P. 152–155° C.

EXAMPLES 11 TO 15

The following compounds were prepared substantially according to the same process described in the previous examples.

| | Compound | | | | Melting point, ° C. |
|---|---|---|---|---|---|
| | R' | R'' | R''' | R'''' | |
| Example: | | | | | |
| 11 | —$C_2H_5$ | —$C_2H_5$ | H | 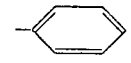 | 197–203 |
| 12 | —$CH_2$—$CH_2OH$ | —$CH_2CH_2OH$ | —$CH_3$ | —$CH_2$ | [1] 196–199 |
| 13 | Same | Same | —$CH_3$ | —$C_2H_5$ | [1] 200–202 |
| 14 | 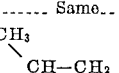 | | —$CH_3$ | —$CH_3$ | 173–175 |
| 15 | 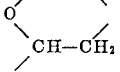 | | H | 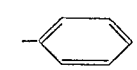 | 241–245 |

[1] (Monohydrochloride.)

We claim:
1. A 3,6-disubstituted pyridazine of the formula

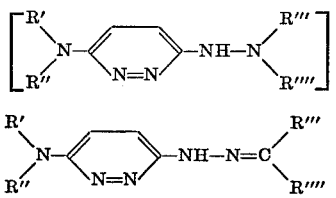

wherein R' and R" are members of the class consisting of alkyl of 1 to 2 carbon atoms and hydroxy-ethyl, or, taken together, form a morpholino, 2,6-dimethylmorpholino, 4-methylpiperazino, 3,4,5-trimethylpiperazino or piperidino ring, R''' is a member of the class consisting of hydrogen and methyl, and R'''' is a member of the class consisting of methyl, ethyl, phenyl, carboxy, nitro-substituted furyl and nitro-substituted thienyl.

2. A compound as in claim 1, wherein the 3,6-disubstituted pyridazine is 3-(2-isopropylidene-hydrazino)-6-morpholino-pyridazine.

3. A compound as in claim 1, wherein the 3,6-disubstituted pyridazine is 3-[2-(1-methylpropylidene)-hydrazino]-6-morpholino-pyridazine.

4. A compound as in claim 1, wherein the 3,6-disubstituted pyridazine is 3-(2-isopropylidene-hydrazino)-6-(4-methyl-1-piperazino)-pyridazine.

References Cited

UNITED STATES PATENTS 3,234,219   2/1966   Schmidt et al. _____ 260—250

ALEX MAZEL, Primary Examiner

A. M. T. TIGHE, Assistant Examiner

U.S. Cl. X.R.

260—250 A, 240 G; 424—248, 250